United States Patent [19]

Beckius

[11] 4,189,047
[45] Feb. 19, 1980

[54] ENDLESS CONVEYOR

[75] Inventor: Herbert J. Beckius, York, Pa.

[73] Assignee: Alto Corporation, York, Pa.

[21] Appl. No.: 841,574

[22] Filed: Oct. 12, 1977

[51] Int. Cl.² .................................................. B65G 15/30
[52] U.S. Cl. ........................................ 198/778; 198/815
[58] Field of Search .................. 198/778, 813, 815, 831

[56] References Cited

U.S. PATENT DOCUMENTS

| 1,812,538 | 6/1931 | Lockert et al. | 198/815 |
| 2,633,977 | 4/1953 | McMillan | 198/815 |
| 2,751,065 | 6/1956 | Thomson | 198/815 |
| 2,771,178 | 11/1956 | Holmburger | 198/815 |
| 3,261,452 | 7/1966 | Thomson | 198/815 |
| 3,313,397 | 4/1967 | Evans et al. | 198/815 |
| 3,500,989 | 3/1970 | Cripe et al. | 198/854 |
| 3,536,183 | 10/1970 | Locke | 198/778 |
| 3,664,487 | 5/1972 | Ballenger | 198/778 |
| 3,666,083 | 5/1972 | Smith | 198/778 |
| 3,687,274 | 8/1972 | Clark et al. | 198/815 |
| 3,866,432 | 2/1975 | Harrison | 198/778 |
| 4,033,451 | 7/1977 | Kelsall | 198/815 |
| 4,036,352 | 7/1977 | White | 198/778 |

FOREIGN PATENT DOCUMENTS

| 590625 | 7/1947 | United Kingdom | 198/778 |
| 431075 | 4/1975 | U.S.S.R. | 198/815 |
| 542697 | 1/1977 | U.S.S.R. | 198/815 |

Primary Examiner—Richard A. Schacher
Attorney, Agent, or Firm—Thomas Hooker

[57] ABSTRACT

An endless conveyor where the tension of the belt carrying the product cannot be readily adjusted during operation, the conveyor having a progressive counterweight device for tensioning of the belt where lengthening of the portion of the belt carrying the product automatically reduces the tension force and shortening of the belt carrying the product automatically increases the tensioned force.

14 Claims, 6 Drawing Figures

ENDLESS CONVEYOR

This invention relates to endless conveyors and tensioning devices used to maintain the tension of the belt during operation of the conveyor. More particularly, the invention relates to a progressive counterweight tensioning device which is primarily intended for use with a double helical type endless conveyor where the tensioning device is located between the infeed and discharge stations and controls the tension of a portion of the conveyor belt which does not carry product. The tensioning device senses whether belting is supplied to it at a rate greater or less than the rate at which belting is removed from it and automatically controls the tension of the belting moving toward the product infeed station in response thereto. For instance, in the event the portion of the belting carrying the product is too tight, more belting is supplied to the tensioning device then is removed from it. The device senses this and automatically, with a minimum of movement within the device, reduces the tension of the belting fed to the infeed station. If the portion of the belting carrying the product is too loose then less belting is fed to the tensioning device than is removed from it and the device automatically and, with a minimum of movement, increases the tension of the belting supplied to the infeed station.

The tensioning device of the present invention is particularly adapted for use in double helical conveyors of the type shown in White U.S. Pat. No. 4,036,352 and Ballenger U.S. Pat. No. 3,664,487. In both these patents a relatively long conveyor carries product from an infeed station up and down a pair of spiral paths to a discharge station. Driving angles engage the belt as it is moved up and down the spiral paths and prevent ready adjustment of the belt tension while it is carrying product. A single weight gravity tensioning station is provided between the discharge and infeed stations in the conveyors disclosed in both the White and Ballenger patents. This type of tensioning device is similar to that shown in Locke U.S. Pat. No. 3,536,183 where a constant tension force is maintained on the belting by a single pendant weight. See FIGS. 3 and 4 of the Locke patent. This type of single force tensioning device has proved unsatisfactory because it is unable to adjust to the tension of the belting as it leaves the tensioning device in response to the tension of the belting in the product-carrying station of the conveyor. The tension in this section of the conveyor varies in response to different conditions which have required manual addition or subtraction of weights to or from the single tensioning weight. Manual adjustment of the belt tension in inherently inefficient and because there is inevitably a lag between the time the conditions change within the conveyor and the time when the corresponding adjustment is made to the weight, results in increased conveyor wear and increased conveyor malfunction requiring shut down and repair of the conveyor.

The tension in the belting between the infeed and discharge stations in the White and Ballenger conveyors may be altered by a number of different mechanisms. In these types of conveyors, the belting rests on and is pushed along a pair of support rails so that the tension of the belting between the infeed and discharge stations is, in large part, dependent upon the frictional drag exerted on the conveyor belting by the rails. Ideally, there is suitable lubrication between the belting and rails so that the drag is not excessive and has little effect upon belt tension. In practice, the efficiency of the lubrication may vary with the result that the coefficient of friction between the belt and rails may increase so that the belt is elongated and belt tension increases. The coefficient of friction between the belt and rails is also increased when product is loaded onto the belting from the infeed station. This is because the rails support the weight of the product. During loading of an empty conveyor the increased product weight tensions and lengthens the portion of the belting on which the product rests. Conversely, when a full conveyor is emptied of product the coefficient of friction between the newly emptied belting and the rails is reduced thereby reducing tension and shortening the belting.

If the belting in the conveyor is lengthened unduly, then the drive connection between the inner chain of the belting and the vertical drive angles which move the belting up and down the two spiral paths may be reduced sufficiently to allow undesirable slippage or chattering between the angles and the belting. If the tension of the belting becomes too tight then unloaded conveyor belting tends to hangup or climb the drive angles as it is moved along the descent spiral path.

The tensioning system of the conveyor described herein includes a tensioning cable secured at one end to a roller around which the belting is wrapped with the other end extending around guide pulleys and down into a vertical weight-confining cage. A first fixed weight is mounted on the lower end of the cable and a second weight rests on either an adjustable collar secured to an upper part of the cable or a support platform on the cage, dependent upon the tension which need be supplied to the belting moving from the tensioning device to the conveyor infeed station. When properly adjusted, the tension of the belting may be varied as needed to compensate for variations within the conveyor away from the tensioning station by very slight movement of the roller. When ideally adjusted, the second weight nearly always rests on the platform and to the adjustable collar with the support of the weight shifting back and forth between the two dependent upon the changes in the required belt tension.

The roller of the tensioning device is mounted on a plate carrying an actuator bracket which is located between a pair of limit switches mounted on the conveyor frame. The limit switches are positioned just outside the normal range of movement of the bracket required to vary the belt tension so that movement outside of this range brings the bracket into engagement with a switch to automatically shut down the conveyor. The roller movement required to adjust the tension is relatively small so that the switches are relatively close together and shut down occurs relatively instantaneously upon a malfunction. The weight secured to the lower end of the tensioning cable is sufficient to draw the arm back and engage the limit switch in the event the belt breaks. In the event the tension of the belt becomes too great the roller is drawn forward so that the bracket engages the forward limit switch to close it and shut down the conveyor. By rapid closing of the limit switches it is possible to shut down the conveyor within a minimum of time after the tensioning device senses the malfunction so that further damage may be prevented.

The very small movement of the roller required to maintain belt tension means that the unsupported run of the belt from the roller at the end of the conveyor path leading to the tensioning device to the tensioning roller may be reduced considerably over the lengths of unsupported runs in conventional single weight tensioning devices. This close spacing of the two rollers assures that the unsupported run does not hang down and undesirably wear on the run extending from the tensioning roller to the infeed station.

Other objects and features of the invention will become apparent as the description proceeds, expecially when taken in conjunction with the accompanying drawings illustrating the invention, of which there are two sheets.

IN THE DRAWINGS

Figure 1:
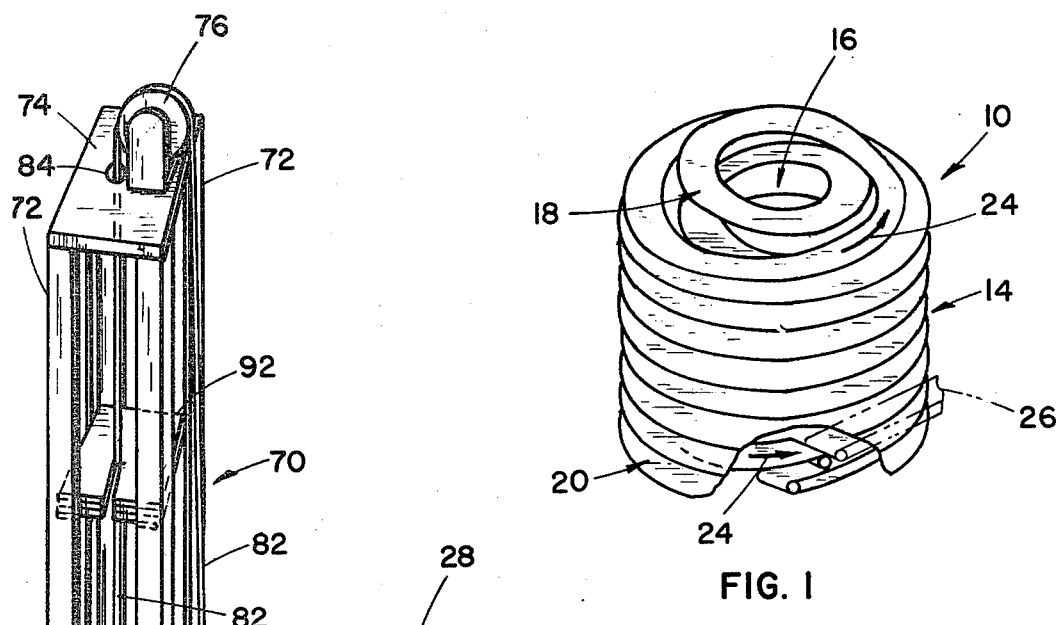
FIG. 1 is a perspective view of an endless conveyor according to the invention.

Endless conveyor 10 is generally of the type disclosed in White U.S. Pat. No. 4,036,352, the disclosure of which is incorporated herein by reference. The conveyor includes a support frame 12, partially illustrated in FIGS. 2 and 3 which defines a pair of inner and outer concentric spiral paths 14 and 16. As illustrated in FIG. 1, outer spiral path 14 spirals upwardly from the bottom to the top of conveyor 10 and inner spiral path 16 spirals downwardly from the top of the conveyor to the bottom of the conveyor. A crossover 18 joins the paths 14 and 16 of the top of the conveyor and a crossover 20 joins the spiral paths at the bottom of the conveyor. A continuous wire link belt 22, which may be of the type described in greater detail in White U.S. Pat. No. 4,036,352, is supported on the belt path of conveyor 10 so that it is moved along the conveyor path in the direction of arrows 24.

Conveyor 10 may be used as a storage conveyor to receive product from an infeed station illustrated more clearly in the White U.S. Pat. No. 4,036,352 and move the product up the outer spiral path 14, across crossover 18, and down the inner spiral path 16 to a discharge conveyor 26 illustrated at FIGS. 1 and 3 which removes the product from conveyor 10. The belt passes from the discharge conveyor to a tensioning station 28 and thence back to the infeed station.

Figure 2:
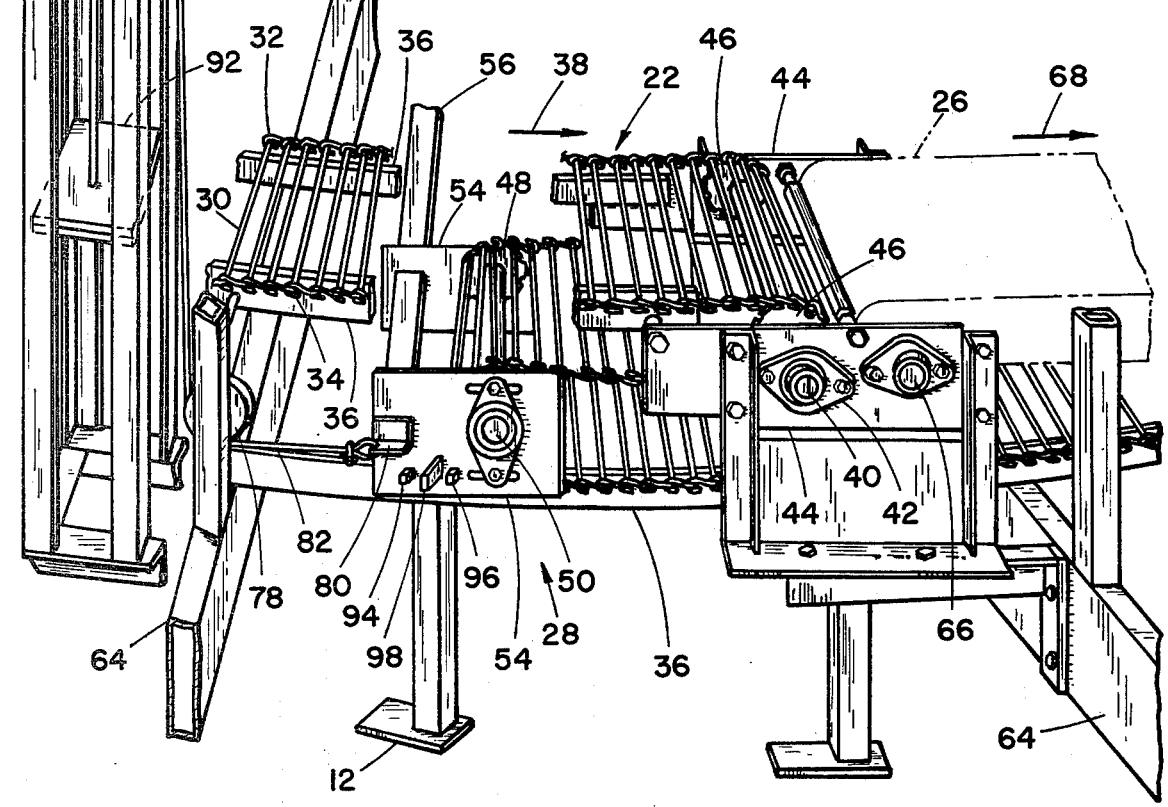
FIG. 2 is an enlarged view, partially broken away, of the tensioning station of the conveyor of FIG. 1.

As illustrated in FIG. 2, the belt 22 comprises a number of transversely extending rods 30 having links at the ends thereof forming inner and outer chains 32 and 34. The belt 22 is supported by a pair of spaced parallel rails 36 which extend along the conveyor path from the tensioning station to the infeed station, up the outer spiral 14, across crossover 18 and down the inner spiral 16 to the discharge conveyor 26.

As described further in the White U.S. Pat. No. 4,036,352, belt 22 is driven around the closed path of conveyor 10 by a pair of cylindrical drive frames located inwardly of each of the spiral paths 14 and 16. Each frame is rotated in the direction of arrows 24 and carries a number of vertically continuous drive angles having sharp edges facing the belting. The drive angles seat within the recesses between links of the inner chain 32 and thereby drive the belting along the conveyor path. Suitable lubrication is provided to reduce friction between the conveyor belt 22 and the tops of the support rails 36.

Figure 3:
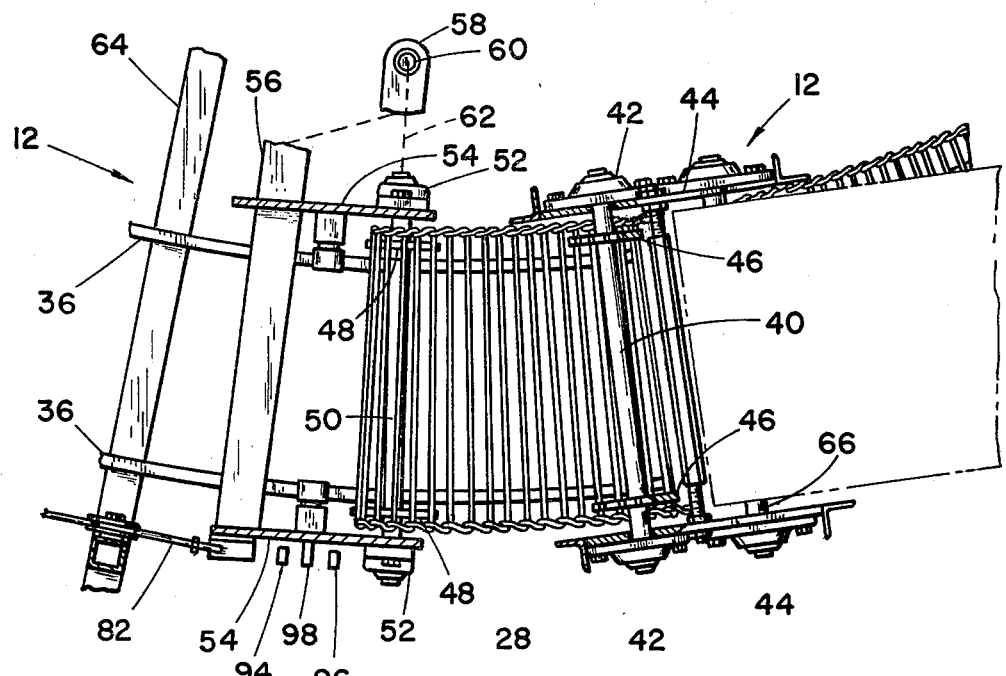
FIG. 3 is a top view of part of the tensioning station as illustrated in FIG. 2.

Referring to FIGS. 2 and 3 of the drawings, support rails 36 extend from the lower end of the inner spiral path 16 to transverse shaft 40 which is journaled in bearings 42 mounted on fixed plates 44 of support frame 12. Shaft 40 carries a pair of sprocket gears 46 which engage the transverse rods 30 of belt 22. The axis of rod 40 is located on a radius of the conveyor so that an extension of the axis of the rod passes through the common vertical axis of the two spiral paths 14 and 16. In this way, proper engagement is maintained between the belt and the sprocket gears 46. Belt 22 passes over sprocket gears 46 and extends freely from them a short distance upstream with respect to the direction of movement of the belt to shaft 40 as indicated by arrow 38 to a second set of sprocket gears 48 located on radial shaft 50 which is journaled in bearings 52 carried by spaced plates 54. The plates 54 are secured to one end of arm 56 which extends inwardly past the inner spiral path 16 to a pivot connection 58 on the central axis 60 of the conveyor. This enables the arm 56 to be pivoted back and forth about the axis 60 of the conveyor. The shaft 50 is radially oriented so that a continuation of the axis thereof passes through the vertical conveyor axis 60 as indicated by the dotted line 62 of FIG. 3. Plates 54 carry support rollers 64 which rest on the belt support rails 36 extending from the tensioning station 38 toward the infeed station. The rails 36 are in turn supported by radial frame members 64 which form part of the conveyor support frame 12. The belt extends around sprockets 48 down to the lower rails 36 and thence along the conveyor path to the infeed station.

One end of discharge conveyor 26 extends around sprockets on shaft 66 journaled in bearings carried by plates 44. Shaft 66 parallels shaft 40. The upper run of the discharge conveyor 26 is moved in the direction of arrow 68 so that product carried by belt 22 passes over shafts 40 and 66 and is transferred to the discharge conveyor 26.

Figure 4:
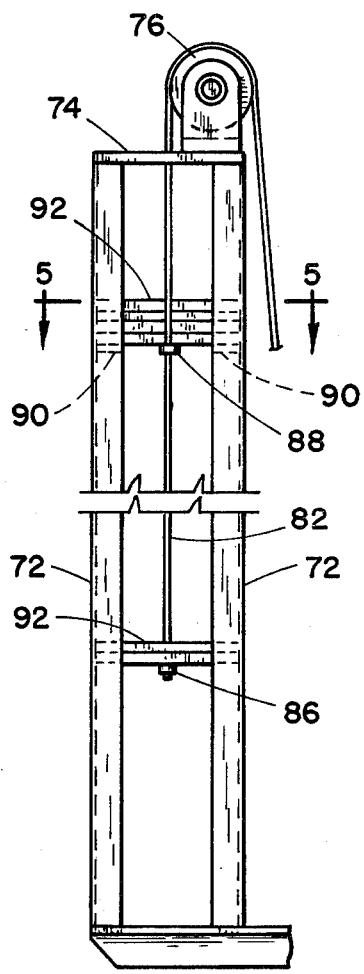
FIG. 4 is a side view, partially broken away, of the counterweight system shown in FIG. 2.
Figure 5:
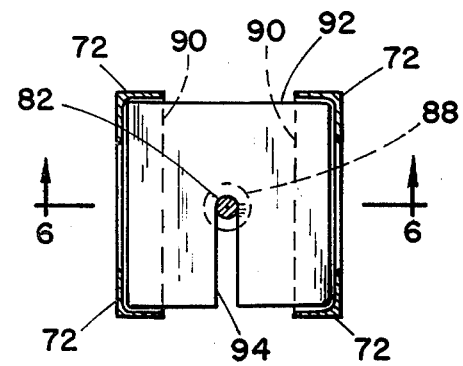
FIG. 5 is a sectional view taken along line 5—5 of FIG. 4.
Figure 6:
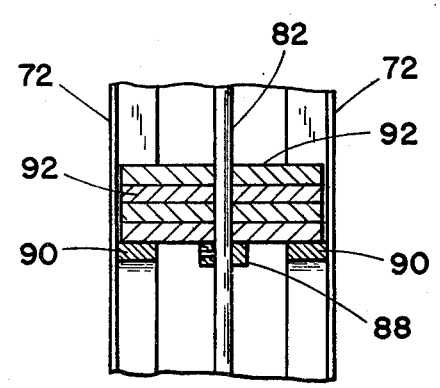
FIG. 6 is a sectional view taken along line 6—6 of FIG. 5.

Progressive counter weight cage 70 is located on the end of one of radial frame member 64 outwardly of the outer spiral path 14. The cage includes four vertical angle members 72 which are located at the corners of the square as illustrated in FIG. 5. Top plate 74 is secured to the upper ends of angles 72 and carries a tension cable guide pully 76. A second cable guide pully 78 is secured to the frame member 64 at approximately the level of bracket 80 located on the outer plate 54. One end of tensioning cable 82 is secured to bracket 80 with the cable extending therefrom being led around pullys 78 and 76, through opening 84 top plate 74 and down into the interior of cage 70. As illustrated in FIG. 4, a fixed stop collar 86 is secured to the lower end of cable 82 within the cage and an adjustable stop collar 88 is secured to the cable above the stop 86 and adjacent to fixed platform supports 90 which extend between adjacent pairs of angles 72.

Tension is maintained on cable 82 by a number of square flat weights 92 which rest on collars 86 and 88. As illustrated in FIG. 4, two weights 92 may rest on the fixed collar 88 at the lower end of cable 82 to form a permanent counterweight. Three weights may be placed on the cable 82 above collar 88 and may rest on the collar 88, on supports 90, or on both as will be described hereinafter. Slots 94 are provided in the weights 92 to facilitate mounting of the weights on the cable 82.

As illustrated in FIG. 5, the square weights 92 are confined within the square interior of the cage 70 defined by the angles 72 with the corners of the weights located within the interior corners of the angles to prevent lateral movement therefrom while permitting the required vertical movement in response to foreshortening or elongation of the belt. The weights have a free fit within the cage to permit vertical movement.

When a conveyor 10 is assembled at a customer's plant it is necessary to test the conveyor and determine the proper number of weights to be mounted on the fixed stop collar 86 and on the adjustable stop collar 88 in order to assure proper production operation of the conveyor. The first step in this procedure is to assure that there is proper lubrication between the conveyor belt 22 and the support rails 36. Prior to start up, a number of weights are placed on the fixed stop collar 86 at the lower end of cable 82 to assure that the arm 56 is biased in a direction to the left as viewed in FIG. 2 in order to tension the belt an amount believed sufficient to maintain the inner belt chain 32 in proper driving connection with the drive angles on the rotary drums located inside of each of the spiral paths 14 and 16.

Upon initial start up of the conveyor without product it is necessary to observe the engagement between the belt and the drive angles of the inner drum. If lifting occurs it is necessary to remove weights from collar 86 until it stops. If lifting does not occur then weights are added to collar 86 until the belting starts to lift on the inner drum and the last weight is removed.

Prior to splitting up the weights between the two collars, the belt is run around the conveyor path at least two times in order to equalize tension throughout the conveyor. The adjustable collar 88 is then fixed to cable 82 at a position where the upper support surface is approximately ½ inch above the supports 90. When in this position, ½ inch lowering of the cable will bring weights carried by collar 88 into engagement with the supports 90. As a first approximation, all but two of the weights carried by the fixed collar 86 are placed on the adjustable collar. With the weights thus split between the two collars, product is fed onto the conveyor from the infeed station so that it travels around the conveyor path and ultimately is discharged on conveyor 26. As the product is fed onto the conveyor the weight of the product increases the frictional engagement between the belt 22 and the support rails 36 thereby increasing tension and elongating the belt so that more belt is fed to the tensioning station than is removed from the station. The extra belting permits the arm 56 to pivot to the left as viewed in FIG. 2 and cable 82 in cage 70 to move down. The tension of the cable and belt is unchanged until the arm 64 has moved to the left approximately one-half inch so that the weights on the adjustable collar rest lightly on the platforms 90. When these weights first engage the platforms 90, all of their weight tensions the cable. When the tensioning station is properly adjusted, further loading of the product onto the conveyor elongates the belt sufficiently to allow the weight carried by the adjustable collar to be gradually transferred to the supports 90. Full elongation of the belt by the product results in sufficient movement of the arm 56 to the left as shown in FIG. 3 to transfer less than all of the tensioning weight from the adjustable collar to the platforms while some of the cable tension is supplied by the weights formerly totally carried by the adjustable collar.

When product is no longer fed into the conveyor and the product on the conveyor is discharged the result is that the frictional loading between the belt and the rails is decreased and the belting shortens. Less belting is fed into the tensioning station than is removed from the tensioning station. Arm 56 is moved toward the right and additional tension is supplied to the cable by transferring the weight from the platform 90 back to the cable. When the product has been completely discharged from the conveyor the upper weights may be in the initial position with the lower surface of the weights on the adjustable stop approximately one half inch above the platforms 90 or the weights may rest lightly on the platforms.

Normally after product has been fed onto and discharged from the conveyor a number of times the tensioning system will stabilize at a position where the weights on the adjustable stop rest on the platforms 90 at all times and the differences in tension required to match the tension requirements of the belting are supplied by splitting the support of these weights between the cable and the supports 90 as previously described. At most, the adjustable stop should lift the upper weights above the supports only about one half to one inch. This provides one to two inches variation in the length of the belting at the tensioning station so that a minimum travel of the arm 56 is required.

The progressive counterweight system of station 28 controls the tension of the belt 22 with very little backward and forward movement of arm 56. With the limited movement of arm 56 it is possible to locate shaft 50 closely adjacent to shaft 40 so that the length of the belt run between the two shafts is only a few times greater than the distance between the run and the run of the belt supported on rails 34 extending from shaft 50 to the infeed station. By so limiting the length of the unsupported run it is possible to prevent the unsupported run from hanging down and physically wearing on the supported run. The catinary of the unsupported run can easily sag to engage the supported run when the separation distance between the two runs is small as compared to the separation distance between the two shafts at the ends of the unsupported run. For instance, see FIG. 3 of Locke U.S. Pat. No. 3,536,183 where the shaft spacing is large and wear could occur.

If during adjustment of the tensioning station it is found that the upper weights are entirely carried by the supports 90 and the adjustable collar 88 has moved below the weights it is then necessary to remove one of the weights held by the lower fixed collar and add it to the upper weights.

In addition to automatically compensating for variations in the belt length and tension due to the weight of product carried by the conveyor, the tensioning station 28 also automatically adjusts the belt to avoid undesirable belt chattering or climbing on the drive angles of the inner descent path. During normal operation chattering is avoided because shortening of the belt on the conveyor path supplies belting to the tensioning station slower than it is removed from the station thereby automatically increasing the tension on the cable with the result that further lengthening of the belt is resisted. Lifting or climbing of the belt occurs when the belt in the conveyor is too tight and more belt is discharged into the tensioning station than is removed from the tensioning station. The result is that the tension in the belt is reduced as it leaves the tensioning station and wound on the drums, thereby reducing the tension of the belt in the conveyor so that lifting is prevented.

The tensioning station also automatically compensates for increase in the frictional forces between the belt and the support rails due to decrease in lubrication efficiency. If there is bad lubrication the belt hangs up on the rails and effectively shortens the belt to reduce the rate at which belting is supplied to the tensioning station. This causes the weights to be lifted, increasing the belt tension of the belt wound on the drums so that the frictional forces may be overcome. Ratcheting may also occur if the frictional forces exceed the driving force on the descent path of the inner spiral 16.

When product is run with good lubrication little tensioning force is required and the conveyor operates essentially in the same mode as if it were empty. When product is run with bad lubrication the belt is foreshortened and extra tensioning force is automatically supplied.

A pair of limit switches 94 and 96 are mounted on the conveyor support frame 12 with flange 98 on the outer plate 54 located between the switches. Movement encountered during operation of the tensioning system does not move the flange 98 to engage the trigger of either switch 94 or 96 to close the switch and shut down the conveyor.

In the event the belting 22 breaks the weight or weights carried by the fixed collar on cable 82 is sufficient to pivot the arm 56 to the left thereby bringing flange 98 against switch 94 to close the switch and rapidly shut down the conveyor. Likewise, if there is a jam or hangup in the conveyor the increased tension in the belting will pull the arm 56 to the right as shown in FIG. 3 to move the flange 98 against switch 96 to close it and shut down the conveyor. Because of the limited movement of the arm 56 during normal operation of the conveyor it is possible to locate both limit switches close to the nominal position of the flange so that little movement of the arm 56 is required to close a switch and the conveyor is shut down quickly if the belt breaks, a jam occurs or there is some other malfunction. Rapid shutdown of the conveyor reduces the possibility of further damage occuring after the initial malfunction.

The tensioning system described herein is particularly adaptable for use in conveyors of the type illustrated in FIG. 1, and described in White U.S. Pat. No. 4,036,352 and in Ballenger U.S. Pat. No. 3,664,487 or in conveyor where the belt cannot be readily stretched or relaxed along its length during operation, although the invention is not intended to be limited to conveyors of this type. The tensioning system has been sucessfully used in double helical conveyors having four to 14 tiers where the height of the conveyor may vary from seven and one half feet to twenty one and one half feet, the diameter may vary from 19 to 23 feet and where the width of the belting may be 18, 24 or 30 inches. In the smallest of these conveyors the belt has a total length of 374 feet. In the largest conveyor the belt has a length of 2,183 feet. The individual weights 92 used in the tensioning system may weigh four and one half pounds each. Frequently the tensioning system requires 18 pounds on the adjustable collar and four and one half pounds on the fixed collar. The tensioning systems used in conveyors of this type must be individually adjusted as described herein in order to properly compensate for the inevitable differences, including cumulative errors, in each conveyor.

While I have illustrated and described the preferred embodiments of my invention, it is understood that these are capable of modification, and I therefore do not wish to be limited to the precise details set forth, but desire to avail myself of such changes and alterations as fall within the purview of the following claims.

What I claim my invention is:

1. A conveyor of the type having a frame defining a path traversed by a belt, the path including a product infeed station and a product discharge station, a takeup shaft rotateably mounted on a support moveable back and forth on the frame, the belt being wrapped around the takeup shaft, a tension strand secured at one end to the support for controlling the position of the shaft dependent upon the tension of the strand, the strand extending from the support to a tension device with the other end of the strand hanging vertically, wherein the improvement comprises a fixed weight secured to the other end of the strand, a stop secured to the other end of the strand above the fixed weight, a removable weight normally resting on the stop so that both weights normally tension the strand and bias the shaft in a direction to lengthen the belt, and a weight platform located below the removable weight and in the path of movement of the removable weight upon elongation of the belt whereby during operation of the conveyor when the support moves in a direction to lengthen the belt the other end of the strand lowers and the weight platform supports an increased portion of the removable weight.

2. A conveyor as in claim 1 including a cage surrounding both said weights, a pully on top of said cage, said strand extending from the weights around said pully and to the support, said cage including a number of vertically extending members surrounding the weights and the other end of the strand so as to confine the weights therebetween, and wherein said weight platform comprises at least a pair of members extending between adjacent frame members.

3. An endless conveyor having a frame defining a path traversed by a belt, an endless belt on the path, a tensioning station on the path including a tensioning shaft, the belt being wrapped around the shaft so that movement of the shaft in a first direction tensions the belt and movement of the shaft in the opposite direction loosens the belt, a vertically moveable weight support having a fixed weight and a support surface, a removable weight normally resting on said surface, a platform on the frame located adjacent the surface and in the downward path of movement of the removable weight to pickup the removable weight from the support surface, and an operative connection between the tensioning shaft and the moveable weight support so that the weight of the weight support and the portion of the removable weight resting on the support surface bias the shaft in the first direction to tension the belt, and, upon movement of the shaft in the first direction, the support surface picks up the removable weight to reduce the tensioning bias on the shaft.

4. An endless conveyor as in claim 3 wherein said weight support includes a vertically extending portion of a tensioning strand and a weight secured to said strand, an operative connection between the other end of said strand and said tensioning shaft so that downward movement of the portion of the strand moves the tensioning shaft in said first direction.

5. An endless conveyor as in claim 4 including an adjustable stop secured to the vertical portion of the strand, such surface comprising the upper surface of the stop, a pair of support platforms located on either side of the strand adjacent the stop and wherein the removable weight rests on said upper surface and surrounds the strand, the lower surface of the removable weight extending away from the cable a sufficient distance to overlie the support platforms.

6. An endless conveyor as in claim 5 including a vertically extending cage surrounding the vertical strand and the weights to prevent lateral movement of the weights, said weights closely fitting within the interior of the cage and slots extending from the centers thereof to the circumferences thereof to permit mounting on the strand and a stop on the strand supporting the fixed weight.

7. An endless conveyor as in claim 6 wherein said weights and cage are rectangular with the exterior corners of the weights fitted within the interior corners of the cage.

8. An endless helical conveyor of the type having a support frame defining a first upwardly extending spiral path, a second downwardly extending spiral path concentric with the first path, a crossover path joining said spiral paths at the top of the conveyor, an infeed station adjacent the bottom of said first spiral path, and a discharge station at the bottom of the said second spiral path, and a continuous belt on said spiral path extending from the infeed station, up said first spiral path across the crossover down said second spiral path, past the discharge station and back to the infeed station, a tensioning station located between said discharge and infeed stations, the tensioning station including an elongate support member pivotly connected to the support frame at the central axis of the concentric spiral paths and extending radially outwardly therefrom, a first rotatable shaft mounted on said member with the axis of the shaft extending through the central axis, a second rotatable shaft, said belt being wrapped around the shafts to form a generally S-shaped portion of the belt path at the tensioning station, a strand connected to the support member and running to the top of a counterweight support and extending vertically down therefrom, a support surface on the strand, a fixed weight on the vertical strand, a removable weight normally resting on the support surface and a platform on the counterweight support located below the removable weight whereby movement of the support member to separate the shafts transfers support of the removable weight from the support surface to the platform to reduce the belt tension.

9. A conveyor as in claim 8 wherein the conveyor path continues from the first shaft under the second shaft and onto the infeed station and wherein the distance between the belt on the continuation of the conveyor path and the belt between the two shafts is large as compared to the distance between the shafts.

10. A conveyor as in claim 9 including a switch engaging flange on the support member, a pair of conveyor shut-off switches located to either side of the flange immediately outside the path of normal movement of the flange as the support member is wound back and forth for engagement by the flange when it moves beyond its normal path.

11. The method of controlling the tension in the belt of a conveyor of the type having a continuous path, a movable shaft with the belt wrapped around the shaft so that movement of the shaft in a first direction tensions the belt and movement of the shaft in an opposite direction loosens the belt, and a gravity type counterweight attached to the shaft by a strand to bias the same in the first direction to tighten the belt, comprising the steps of:
  A. Moving the belt around the continuous conveyor path;
  B. Increasing the weight carried by the strand in response to shortening of the belt to thereby increase the belt tension and;
  C. Decreasing the weight supported by the strand in response to the elongation of the belt to thereby decrease belt tension.

12. The method of controlling the tension of the belt in a conveyor of the type having a continuous path, a shaft having a portion of the belt wrapped around the shaft, a connection between the shaft and a gravity counterweight so that the counterweight normally biases the shaft in a direction to maintaining tension in the belt, including the steps of:
  A. Moving the belt around the path and past the shaft;
  B. Supporting the weight by either or both said connection and/or a fixed support;
  C. Increasing the portion of the weight on the support in response to lengthening of the belt so as to decrease belt tension in response thereto; and
  D. Decreasing the portion of the weight on the support in response to foreshortening of the belt to increase the tension of the belt.

13. The method of claim 12 including the step of supporting the weight entirely by said connection when the belt is shortened further.

14. The method of controlling the tension of an endless belt as it moves around the path of an endless conveyor, the path having a nominal length, comprising the steps of:
  A. Maintaining a constant high tension in the belt when the length of the belt is less than the length of the path;
  B. Maintaining a constant low tension in the belt when the length of the belt is longer than the length of the path;
  C. Varying the tension in the belt between said high and low levels when the length of the belt equals the length of the path.

* * * * *